(12) United States Patent
Kagan

(10) Patent No.: US 8,267,669 B2
(45) Date of Patent: Sep. 18, 2012

(54) MAGNETIC INDUCTION PUMP

(75) Inventor: Valery G. Kagan, Colchester, VT (US)

(73) Assignee: Hazelett Strip-Casting Corporation, Colchester, VT (US)

( * ) Notice: Subject to any disclaimer, the term of this patent is extended or adjusted under 35 U.S.C. 154(b) by 958 days.

(21) Appl. No.: 12/123,068

(22) Filed: May 19, 2008

(65) Prior Publication Data

US 2009/0285695 A1    Nov. 19, 2009

(51) Int. Cl.
*H02K 44/00* (2006.01)
*H02K 44/08* (2006.01)

(52) U.S. Cl. .......................................................... 417/50
(58) Field of Classification Search .................. 417/48, 417/50
See application file for complete search history.

(56) References Cited

U.S. PATENT DOCUMENTS

| | | | | |
|---|---|---|---|---|
| 2,915,973 A | * | 12/1959 | Findlay | 417/50 |
| 2,928,349 A | * | 3/1960 | Findlay | 417/50 |
| 3,038,409 A | | 6/1962 | Edgerly et al. | |
| 3,302,573 A | * | 2/1967 | Ledeen | 417/50 |
| 3,411,447 A | * | 11/1968 | Fox et al. | 417/50 |
| 3,662,609 A | * | 5/1972 | Jacobson | 74/5 R |
| 3,804,147 A | | 4/1974 | Babel et al. | |
| 3,902,369 A | * | 9/1975 | Metz | 73/753 |
| 4,260,922 A | * | 4/1981 | Hatch | 310/178 |
| 4,614,225 A | | 9/1986 | Ernst et al. | |
| 4,906,877 A | | 3/1990 | Ciaio | |
| 5,011,528 A | * | 4/1991 | Mulcahy | 75/10.16 |
| 5,042,969 A | * | 8/1991 | Odd | 417/50 |
| 5,080,559 A | * | 1/1992 | Abbin et al. | 417/48 |
| 5,209,646 A | | 5/1993 | Smither | |
| 5,277,551 A | * | 1/1994 | Slepian et al. | 417/50 |
| 5,684,352 A | * | 11/1997 | Mita et al. | 310/156.56 |
| 6,378,743 B1 | | 4/2002 | Kagan | |
| 6,732,890 B2 | * | 5/2004 | Kagan | 222/590 |
| 6,805,834 B2 | * | 10/2004 | Thut | 266/239 |
| 7,042,126 B2 | * | 5/2006 | Sidey et al. | 310/156.43 |
| 8,158,055 B2 | * | 4/2012 | Takahashi | 266/234 |
| 2011/0248432 A1 | * | 10/2011 | Takahashi | 266/237 |

FOREIGN PATENT DOCUMENTS

| | | | |
|---|---|---|---|
| JP | 56012831 | | 2/1981 |
| JP | 56012831 A | | 2/1981 |
| JP | 56132159 A | | 10/1981 |
| JP | 63174555 A | * | 7/1988 |
| JP | 1222648 A | | 9/1989 |
| JP | 2007074837 A | | 3/2007 |

* cited by examiner

*Primary Examiner* — Devon C Kramer
*Assistant Examiner* — Christopher Maxey
(74) *Attorney, Agent, or Firm* — McCormick, Paulding & Huber LLP

(57) ABSTRACT

A magnetic induction pump for pumping molten metal. The pump includes a motor and a shaft operatively connected to the motor. The pump further includes at least one bipolar permanent magnet operatively connected to the shaft and a conduit for the passage of molten metal. The motor rotates the shaft and magnet about the conduit inducing eddy currents in the molten metal in the conduit which react with the moving magnetic field to produce force to pump the metal through the conduit with the metal coming into contact with only an interior surface of the conduit.

22 Claims, 7 Drawing Sheets

MAGNETIC INDUCTION PUMP

FIELD OF THE INVENTION

The present invention relates generally to a pump for molten metal and more specifically to a magnetic induction pump having a magnetic induction rotor for pumping molten metal without the need for direct contact with molten metal.

BACKGROUND OF THE INVENTION

Typically, molten metal is pumped into casting machines and the like by electromagnetic pumps. Many of these pumps utilize the Faraday-Lorentz principles in which electrical energy is converted into mechanical energy. An example of an electromagnetic pump employing powerful neo-magnets is described in U.S. Pat. No. 6,732,890, which is hereby incorporated by reference in its entirety. As will be appreciated, such pumps are generally quite effective at pumping, braking and metering molten metal.

Known electromagnetic pumps typically rely on DC current coming into contact with molten metal through electrodes. To deliver the current, the electrodes are in direct contact with the molten metal. In this regard, electrodes generally extend into a pump conduit through which the molten metal passes. In a known pump, electrodes fit within elongated apertures machined into opposite sides of a molten metal conduit. The electrodes include passageways to accommodate a cooling apparatus that includes tubing through which a liquid coolant passes. Though effective, it is desirable to employ a pump in which there is no contact between electrodes, or any other portion of the pump, and the molten metal. It is also desirable to have molten metal contact only the conduit of a pump.

In view of the above, it is a general object to provide a pump for the pumping of molten metal. In particular, the present invention provides a magnetic induction pump having a magnetic induction rotor for pumping molten metal without the need for direct mechanical or electrical contact between components of the pump and the molten metal.

SUMMARY OF THE INVENTION

It is an object of the present invention to provide a magnetic induction pump.

It is an additional object of the present invention to provide a magnetic induction pump for pumping molten metal.

It is a further object of the present invention to provide a magnetic induction pump for pumping molten metal in which electrodes or other pump components are not in direct mechanical or electrical contact with the molten metal.

It is an object of the present invention to provide a magnetic induction pump for pumping molten metal in which the molten metal only contacts the conduit containing the molten metal.

It is yet another object of the present invention to provide a magnetic induction pump for pumping molten metal that employs a magnetic induction rotor.

It is another object of the present invention to provide a magnetic induction pump for pumping, braking and metering molten metal that employs a magnetic induction rotor that includes neo-magnets.

It is an additional object of the present invention to provide a magnetic induction pump for pumping molten metal in which a flow rate of the molten metal is proportional to a rotational speed of a magnetic induction rotor.

It is an object of the present invention to provide a magnetic induction pump that may be secured to a stationary vessel containing molten metal to transport the molten metal from the vessel.

It is another object of the present invention to provide a magnetic induction pump for pumping molten metal from a vessel into a continuous metal casting machine.

It is yet a further object of the present invention to provide a magnetic induction pump for pumping molten metal from a stationary vessel to another vessel.

It is an additional object of the present invention to provide a magnetic induction pump for pumping molten metal in which a direction of the molten metal flow may be reversed by reversing a direction of rotation of a magnetic induction rotor.

An embodiment of the present invention is a magnetic induction pump for pumping molten metal. The pump includes a motor and a shaft operatively connected to the motor. The pump further includes at least one bipolar permanent magnet operatively connected to the shaft and a conduit for the passage of molten metal. The motor rotates the shaft and magnet about the conduit inducing electric currents in the molten metal in the conduit, these currents interacting with the moving magnetic field to produce force to pump the metal through the conduit with the metal coming into contact with only an interior of the conduit.

These and other objects of the present invention, and their preferred embodiments, shall become clear by consideration of the specification, claims and drawings taken as a whole.

DETAILED DESCRIPTION OF THE PREFERRED EMBODIMENT

Figure 1:
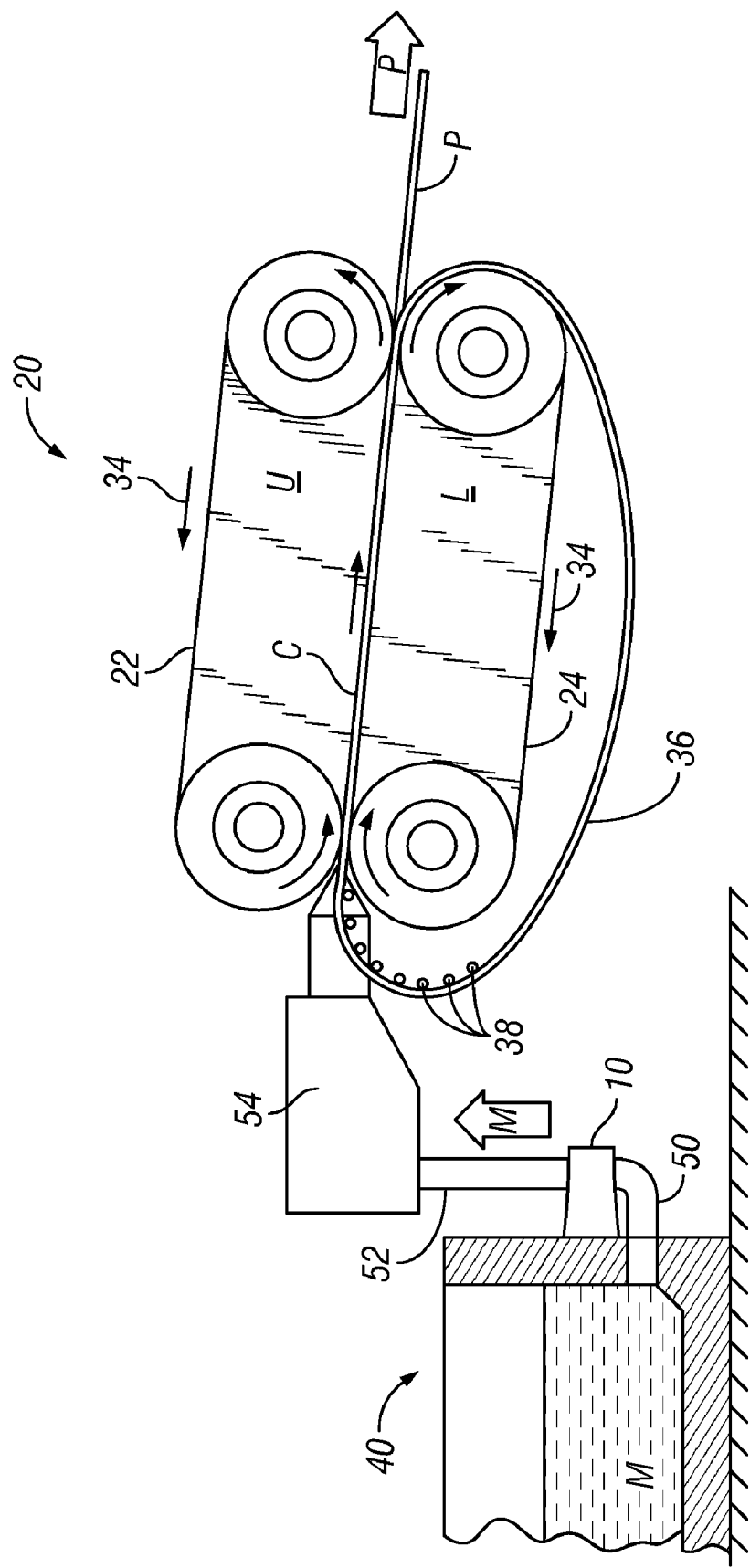
FIG. 1 is a simplified, elevation view of a continuous belt metal casting machine equipped with a magnetic induction pump in accordance with an embodiment of the present invention.
Figure 2:
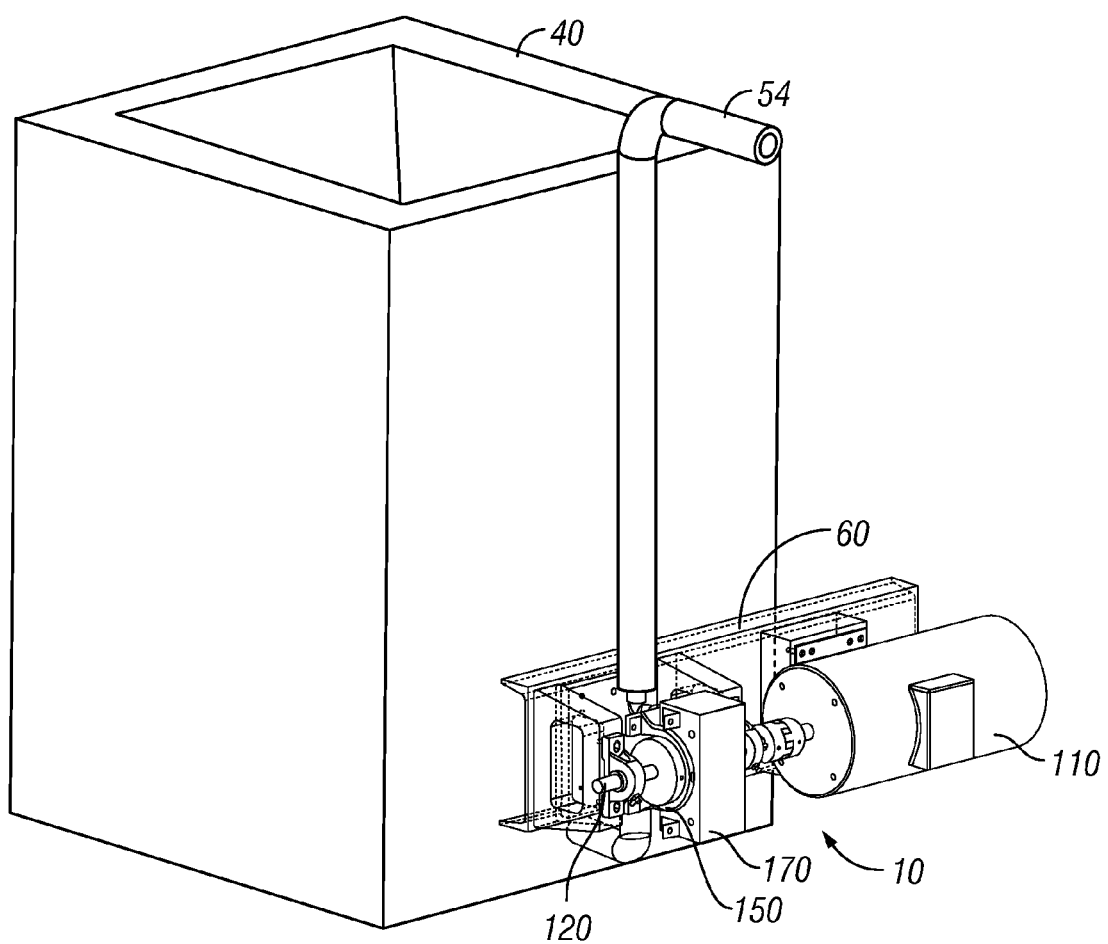
FIG. 2 is a perspective view of the magnetic induction pump of FIG. 1 operatively attached to a melting furnace.

FIG. 1 depicts a preferred embodiment of the inventive magnetic induction pump 10 used with a known belt-type continuous casting machine 20. Such casting machines 20 utilize one or more flexible casting belts 22, 24 as a wall or walls of a moving mold cavity C. The casting belts are thin, flexible, heat-conductive, and liquid-cooled, normally by water. In a machine employing two belts, an upper casting belt 22 is revolved around an upper carriage U, and a lower casting belt 24 is revolved around a lower carriage L. The two belts are revolved in unison around oval paths as indicated by arrows 34, while the molten metal freezes between them in moving mold cavity C formed between the two revolving casting belts to form an emerging cast product P. Additionally, a pair of laterally spaced edge dams 36 are revolved and guided by free-turning rollers 38. These edge dams 36 define laterally a pair of spaced sides of moving mold cavity C.

Molten metal M to be pumped into the casting machine is stored in a melting or holding furnace 40. This metal M flows from the furnace 40 into the inventive magnetic induction pump 10. Internally insulated pipe 52 conveys the metal M upward toward the casting machine 20. In FIG. 1, the metal M is pumped upward into a tundish 54 or distributor for distributing the flowing metal into the upstream entrance end of the continuous metal-casting machine.

As will be readily appreciated, the inventive magnetic induction pump may be used in applications other than continuous casting machines. For example, the pump may be used to simply move molten metal from one container to another, such as from a stationary holding furnace to a mobile container. It may also be possible to use the inventive pump to move a powder, in addition to a liquid molten metal, provided the powder is electrically conductive and does not clump in the presence of a magnetic field.

Figure 3:
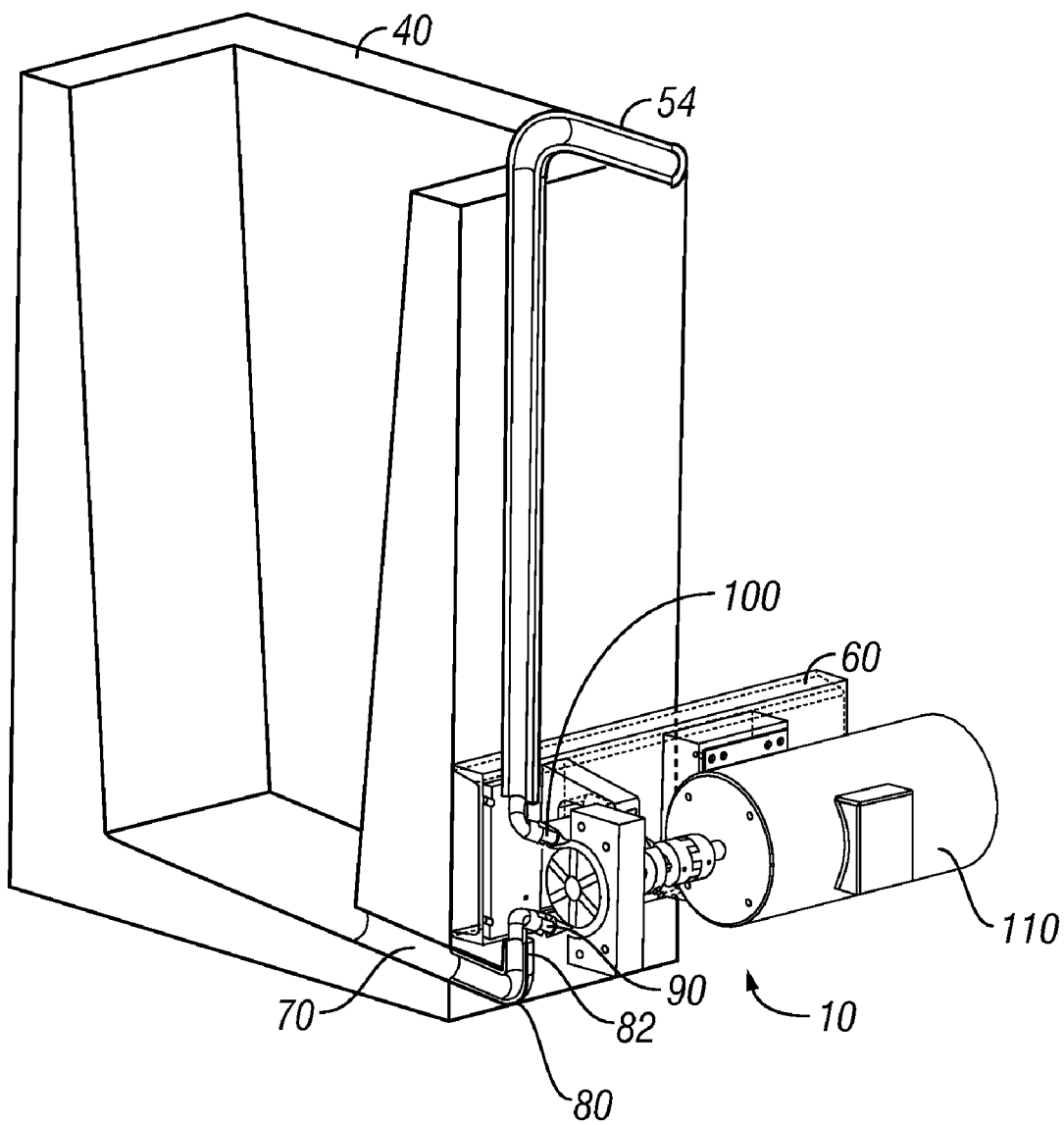
FIG. 3 is a perspective, sectioned view of the magnetic induction pump and melting furnace of FIG. 2.
Figure 4:
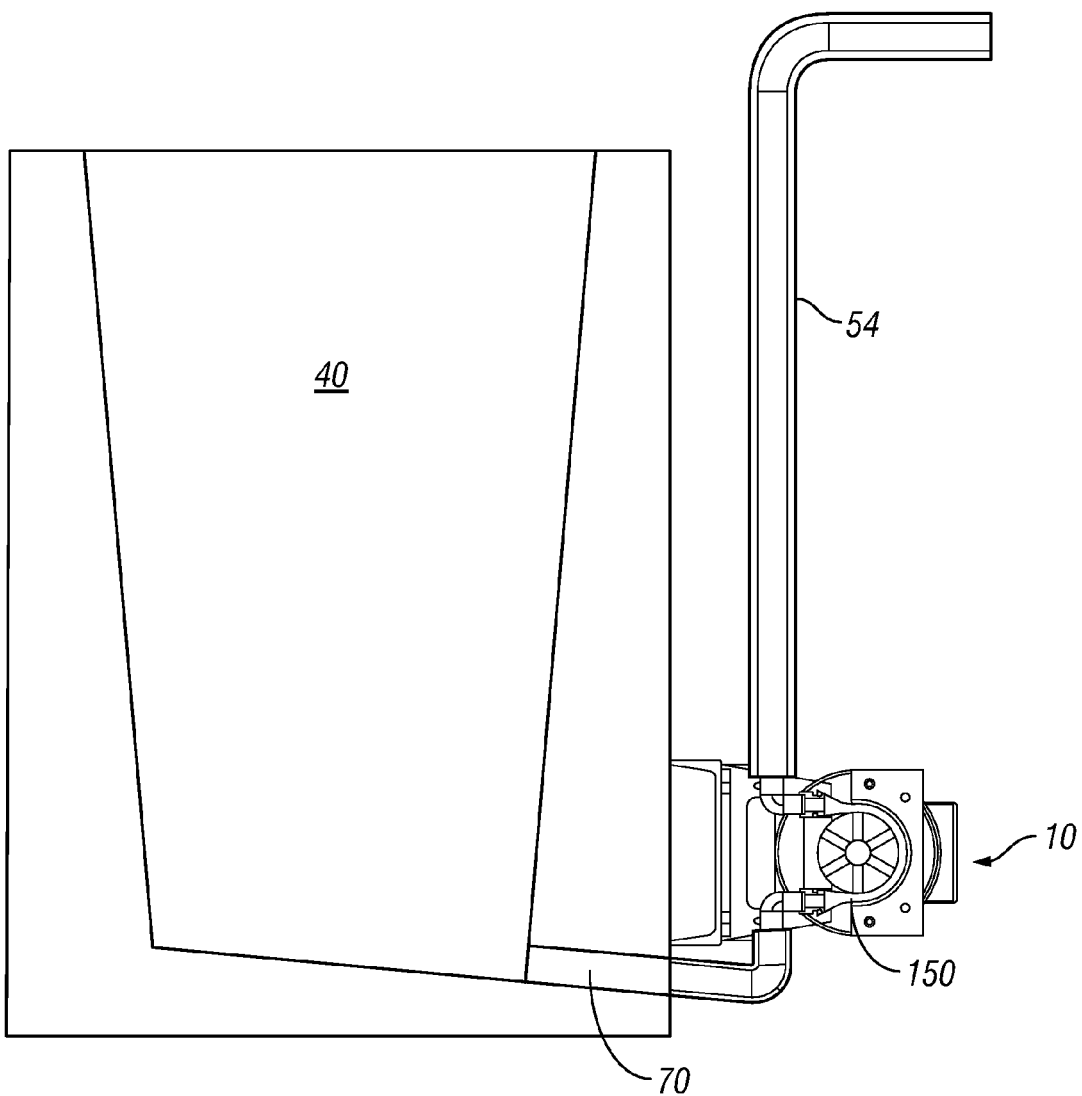
FIG. 4 is a sectioned, elevation view of the magnetic induction pump and melting furnace of FIG. 2.
Figure 5:
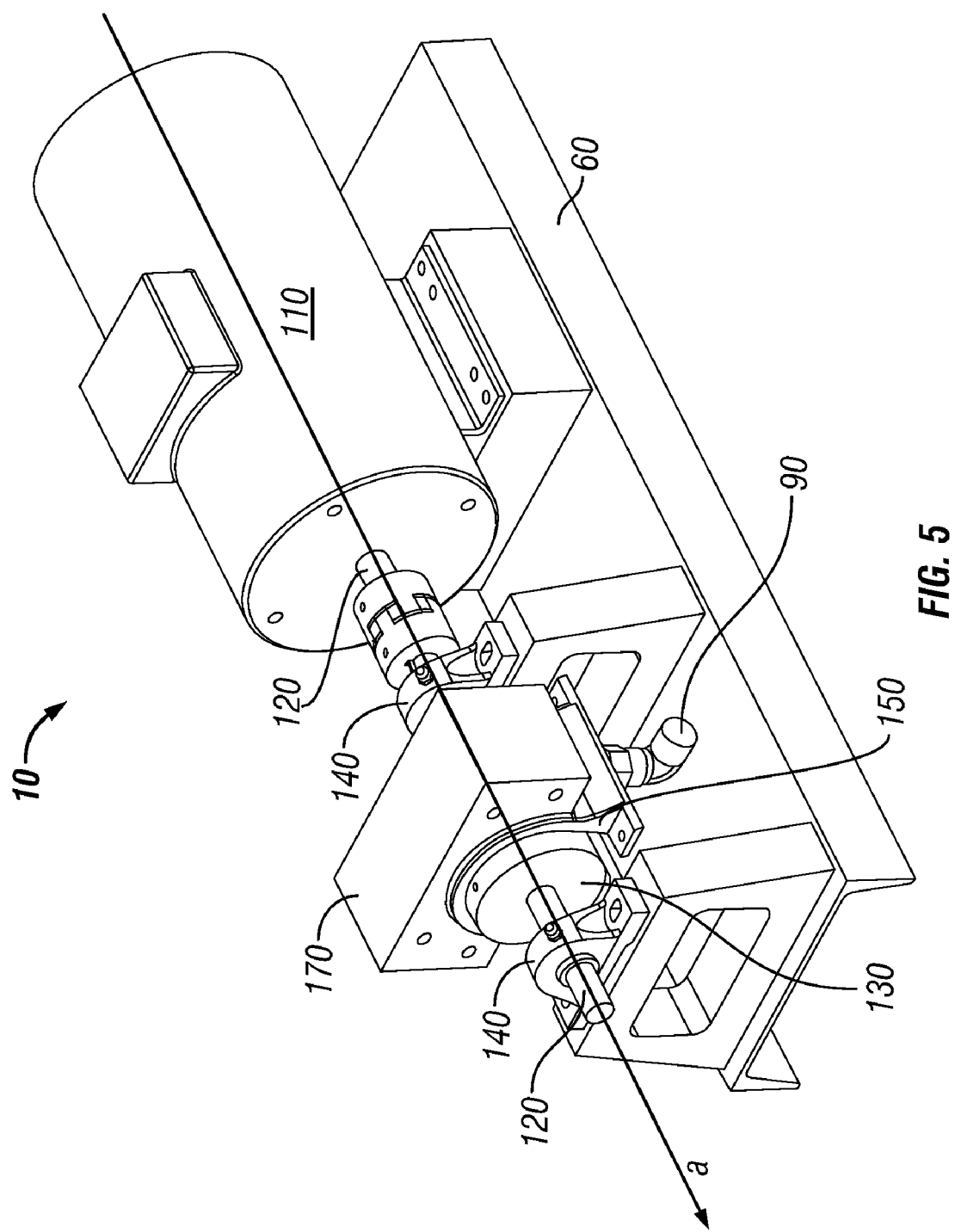
FIG. 5 is a perspective view of the magnetic induction pump of FIG. 2.

Turning now to FIGS. 2-5, the magnetic induction pump 10 is typically mounted to a side surface of a furnace 40 or like container. The pump 10 has a base portion 60, which is removably secured to the furnace 40 with conventional fasteners such as machine bolts (not shown). The pump 10 is ideally secured to a portion of the furnace 40 that is in close proximity to a passageway 70 through which molten metal can exit the furnace 40. As shown in FIG. 3, the passageway 70 preferably includes a section of elbow tubing 80, which terminates in a flange portion 82. The flange portion 82 either extends into or receives a corresponding mating portion of an inlet 90 of the pump 10 so that molten metal may pass into the pump 10 (FIG. 5). As will be apparent, the fit between the elbow tubing 80 and the pump inlet 90 should be such that a secure, leak free seal is obtained.

Generally, the passageway 70 is located on a side portion of the furnace 40 that is close to the furnace bottom. In this way, the magnetic induction pump 10 can be secured to a lower portion of the furnace 40 so that the pump 10 is at a lower elevation relative to the level of molten metal. This eliminates the need to prime the pump 10.

Referring to FIG. 3, the pump 10 also includes an outlet 100. The outlet 100 has a mating portion, which engages an internally insulated pipe 54. The internally insulated pipe 54 conveys molten metal to a casting machine tundish or distributor, or, in other applications, to a separate container. The pipe 54 must mate with the outlet 100 such that a secure seal is created. As shown, the pipe 50 may terminate with a bent, elbow portion that is perpendicular to the central, longitudinal portion of the pipe 54.

Turning now to FIG. 5, the magnetic induction pump 10 includes several components removably mounted to the base 60. These components include a motor 110, that rotates a spindle or shaft 120. The motor 110 is preferably an electrically powered motor varieties of which are commonly known in the art. As will be appreciated, various motor types may be employed with the present pump as long as they have enough power and can reach an RPM sufficient to effectively pump molten metal at a desired head. Other preferred motor varieties include pneumatically and hydraulically powered motors.

The motor drives a shaft 120, which extends through a rotor 130. The shaft 120 is capable of rotating internal components of the rotor 130 about axis a. As shown, the shaft 120 is secured to the base 60 through a series of clamps 140. As will be appreciated, the clamps are fixed with conventional fasteners.

Figure 6:
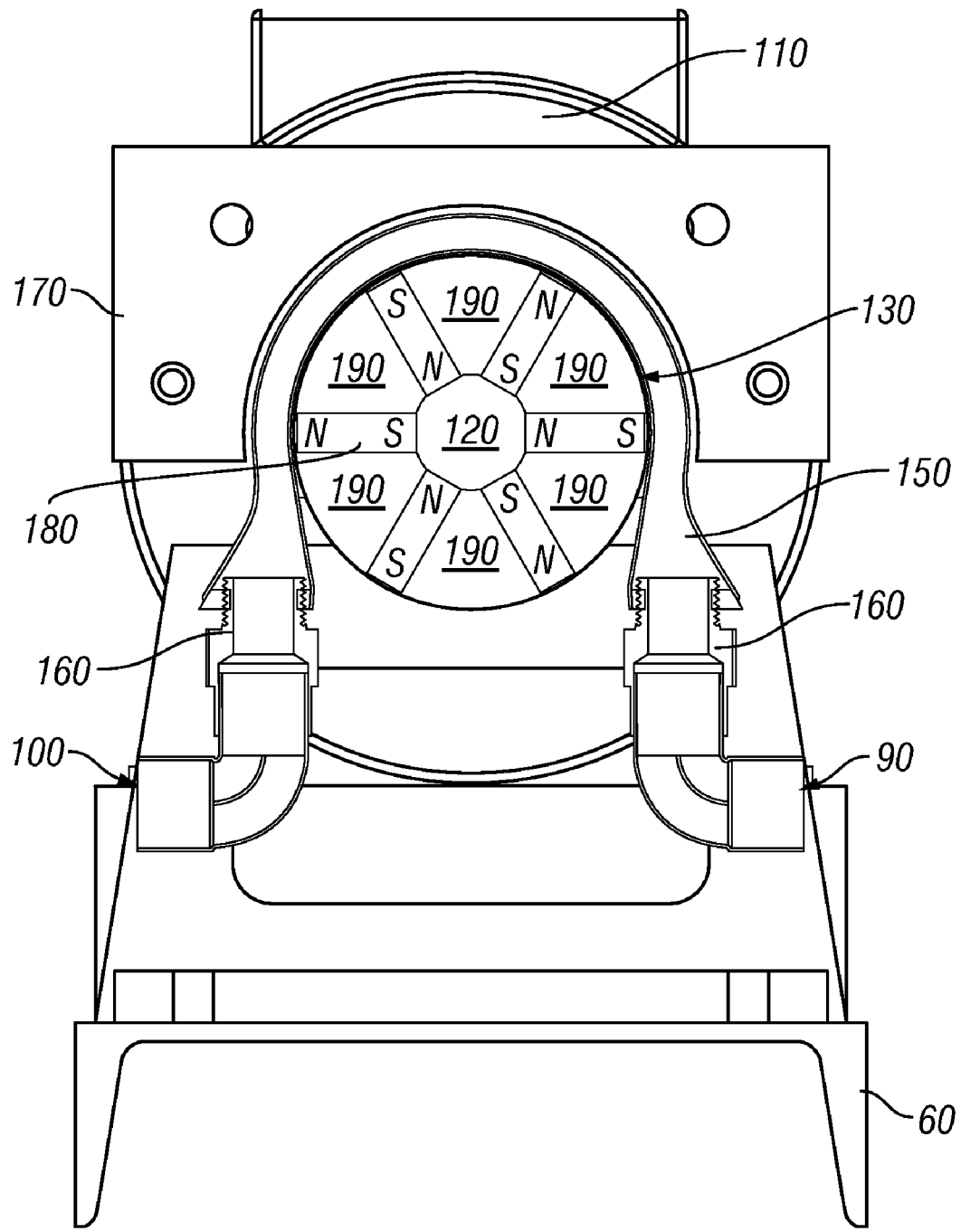
FIG. 6 is a sectioned, end view of the magnetic induction pump of FIG. 5.

The pump 10 also includes a conduit 150 through which molten metal flows. The conduit 150 is substantially arcuate in shape and has a hollow interior cavity through which the molten metal passes. One end of the conduit 150 terminates in the inlet 90 and the opposite end terminates in the outlet 100 (FIG. 6). As shown in FIG. 6, the inlet 90 and outlet 100 are removably secured to the conduit 150 through threaded mating portions 160. The conduit 150 is constructed from a non-magnetic material and is shrouded by a ferromagnetic yoke 170, preferably of silicon steel laminations, having a substantially concave interior portion. The interior portion of the yoke 170 is shaped such that it closely receives the arcuate conduit 150.

Continuing to refer to FIG. 6, the arcuate conduit 150 is shaped such that it fits closely around the cylindrical rotor 130. As shown, the surfaces of the conduit 150, rotor 130, and yoke 170 are substantially concentric. The rotor 130 has an interior which houses the shaft 120 from which a series of permanent magnets 180 extend outward in a spoke like configuration. The shaft 120 within the rotor 130 is preferably manufactured from a ferromagnetic material, e.g., iron.

The ferromagnetic yoke 170 is preferably manufactured from thin laminations of transformer steel, or other suitable ferrous material. The yoke 170 serves to concentrate magnetic flux created by the permanent magnets in the conduit 150 thereby increasing the efficacy of the inventive pump 10. While the yoke 170 is not necessary for the inventive magnetic induction pump to function, it has been found to increase the strength of the magnetic field by 20-30%.

Preferably, the permanent magnets 180 are powerful neo-magnets. Neo-magnets include a "rare-earth" chemical element, for example such as neodymium or samarium. A "rare-earth" element is in the lanthanide-family series of chemical elements numbered 57 to 71. Such magnets are notable for the magnetic strength they provide and for their unique energetic ability to drive their magnetic fields to reach out across relatively wide air gaps, space gaps, or gaps of non-magnetic, i.e. non-ferromagnetic materials, while still providing an intense magnetic field extending across such a gap.

As depicted, the substantially rectangular magnets 180 are bipolar, having north (negative) and south (positive) poles. The magnets 180 are arranged alternatively such that the north pole of a first magnet is adjacent a south pole of a neighboring magnet. In a typical configuration, there are six magnets in an alternating polar arrangement. As shown, the magnets 180 extend in a spoke like arrangement from the shaft 120 and are spaced so that the distance between adjacent magnets, i.e., spokes, is the same for all magnets. In addition, the poles are oriented such that the north pole of a first magnet is across from and aligned with a south pole of the magnet on the opposite side of the shaft 120.

The magnets 180 are separated from one another by inserts 190 which provide structural integrity to the interior of the rotor and effectively prevent the magnets from being displaced while rotating. The inserts 190 are preferably manufactured from aluminum or any other magnetically inert material.

The configuration of the neo-magnets 180, and their relative proximity to the conduit 150, are important aspects of the present invention in that the configuration has been found to create sufficiently strong flux to effectively move molten metal. In particular, the strong magnetic flux created by the interaction of north and south poles optimally penetrates into the molten metal in the conduit inducing current in the metal. The strength of the flux created by the use of neo-magnets in this configuration is sufficient to effectively move the metal through the conduit and out of the pump.

In operation, the inventive magnetic induction pump operates on the Faraday-Lorentz principles in which electrical energy is converted into mechanical kinetic energy in the molten metal. More specifically, the moving magnets induce a current within the molten metal. Mechanical kinetic energy is generated by the force from free electrons within the molten metal effectively moving the metal within the conduit.

The induction of currents within the molten metal is another important aspect of the present invention. Eddy currents are formed by a magnetic field changing in time. This induction of eddy currents in molten metal in the conduit using rotating neo-magnets completely contained within the rotor eliminates the need for electrodes coming into contact with the molten metal. As such, the molten metal only contacts the interior of the conduit creating a durable, leak-free passageway.

In this manner, the magnetic flux from the poles serves as the pump impeller and the metal pressure head and flow rate may be varied by varying the rotational speed for the magnetic rotor. The flow rate is proportional to the rotational speed of the rotor.

Figure 7:
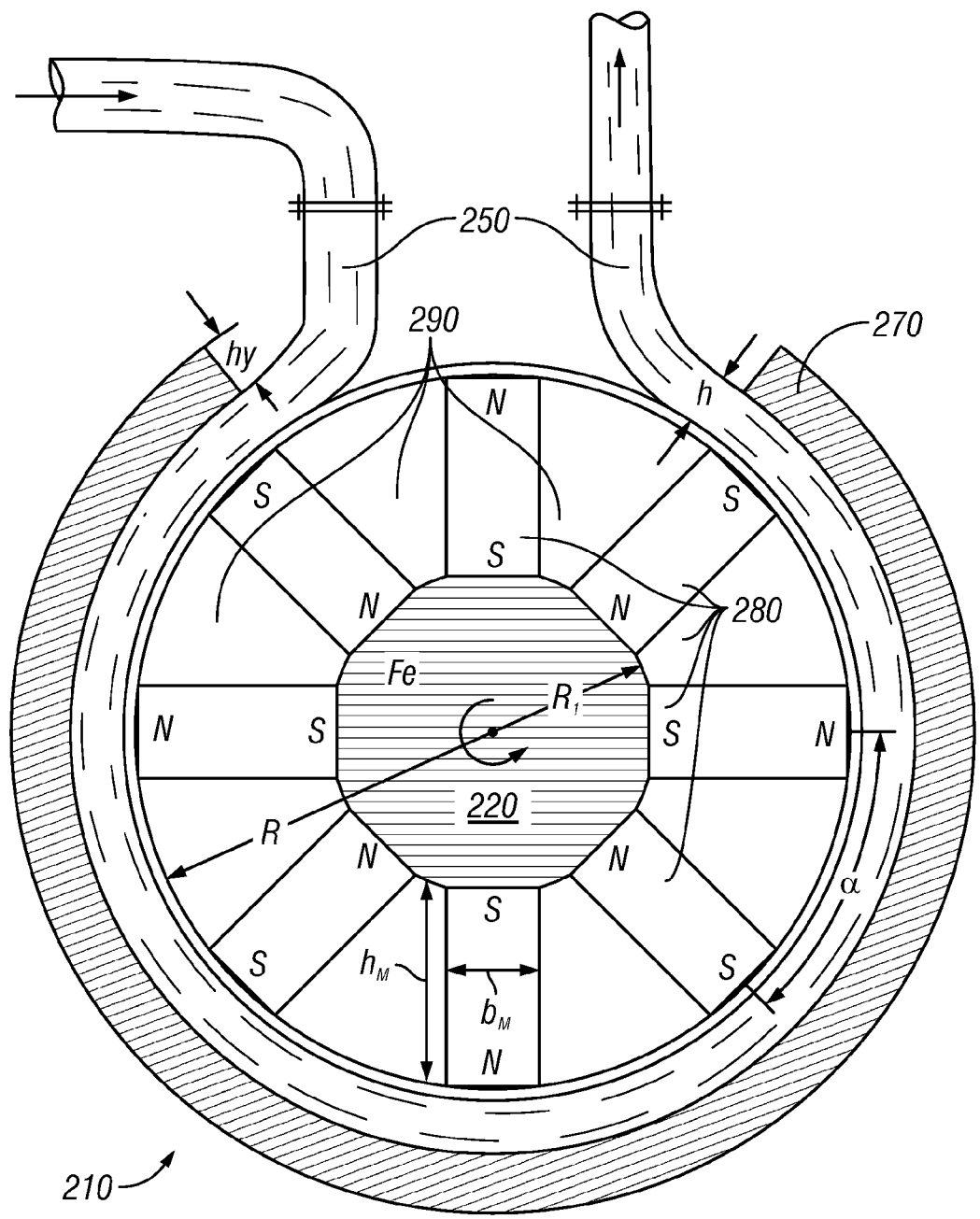
FIG. 7 is a simplified sectioned view of an alternate embodiment of a magnetic induction pump of the present invention.

Turning now to FIG. 7, an alternative embodiment of the inventive pump 210 is depicted. In this embodiment, the rotor includes eight neo-magnets 280 extending from a shaft 220 instead of six. The eight magnets 280 are separated by inserts 290. This embodiment also includes a conduit 250 within a yoke 270. As will be appreciated, other numbers of magnets may be employed provided they generate sufficient flux to move molten metal.

In the rotary configuration shown in FIG. 7, optimal geometric relationships exist. As an initial matter, the geometric relationship discussed below involves the following components and variables:

$h_m$=height of magnet pole
h=height of conduit passage
α=angular spacing of poles
$b_m$=width of magnet pole
R=overall radius of rotor
$R_1$=radius of shaft
p=individual pole
N=2p=pair of poles
$h_y$=thickness of yoke The relationships are between $h_m$ and h, between pitch spacing tau and $b_m$, between tau and the rotor radius R and the number of poles N, between $h_y$ and $b_m$ and between shaft radius $R_1$ and $b_m$. More specifically, preferred relationships are as follows. The height of the magnet pole, ($h_m$), is preferably greater than or equal to 2 to 3 times the height of the conduit passage, (h). The angular spacing of the poles (α) should be greater than or equal to 2 to 3 times twice the conduit height (2h). The angular spacing of the poles should equal 2πR/ 2p or 2πR/ N. The thickness of the yoke, $h_y$, should be greater than or equal to ½ the width of a magnet pole ($b_m$). Finally, the radius of the shaft ($R_1$) should be greater than or equal to the width of a magnet pole ($b_m$). These relationships are particularly important in optimizing the strength of the invention pump.

While described in the context of the embodiment of FIG. 7, the above-referenced relationships and geometry may be employed with other configurations of neo-magnets, such as the configuration depicted in FIG. 6, to optimize pump strength.

Moreover, it may be possible to create a pump that utilizes linear movement of neo-magnets to move molten metal. In such a configuration, the magnets could move linearly along a continuous track type apparatus adjacent a conduit.

While the invention has been described with reference to the preferred embodiments, it will be understood by those skilled in the art that various obvious changes may be made, and equivalents may be substituted for elements thereof, without departing from the essential scope of the present invention. Therefore, it is intended that the invention not be limited to the particular embodiments disclosed, but that the invention includes all equivalent embodiments.

What is claimed is:

1. A magnetic induction pump for pumping molten metal, said pump comprising:
   a motor;
   a shaft operatively connected to said motor;
   at least one bipolar permanent magnet operatively connected to and extending from said shaft in a spoke configuration;
   a non-magnetic conduit for the passage of molten metal, said conduit being substantially arcuate in shape;
   wherein each of said at least one bipolar permanent magnet is oriented on the same lateral side of said conduit such that said conduit is not captured between opposed bipolar permanent magnets; and
   wherein said motor moves said shaft and said bipolar permanent magnet about said conduit thereby inducing an electric current in molten metal in said conduit to pump said molten metal through said conduit with said molten metal coming into contact with only said conduit; and
   wherein a height of said at least one bipolar permanent magnet is greater than or equal to approximately 2 to 3 times a height of said conduit.

2. The magnetic induction pump of claim 1 wherein said pump further comprises a yoke, said yoke being directly adjacent to said conduit and on an opposite side of said conduit than said at least one bipolar magnet, and
   wherein said yoke is ferromagnetic and intensifies a magnetic field generated by said at least one bipolar permanent magnet.

3. The magnetic induction pump of claim 1 wherein said at least one bipolar permanent magnet is a neo-magnet.

4. The magnetic induction pump of claim 1 wherein said at least one bipolar permanent magnet comprises a plurality of pairs of bipolar neo-magnets, and
   wherein said of each bipolar neo-magnets has a polar configuration opposite that of adjacent bipolar neo-magnet.

5. The magnetic induction pump of claim 4 wherein said each of said bipolar permanent magnets is separated from an adjacent bipolar permanent magnet by a magnetically inert spacer.

6. The magnetic induction pump of claim 1 wherein said motor, shaft and conduit are removably secured to a base, said base being capable of selective attachment to a molten metal container.

7. The magnetic induction pump of claim 1 wherein said shaft is ferromagnetic.

8. The magnetic induction pump of claim 1 wherein said shaft and at least one bipolar permanent magnet are housed within a rotor, said rotor being removably secured to said base.

9. The magnetic induction pump of claim 1 wherein a direction of flow of said molten metal may be stopped and reversed by reversing a direction of rotation of said motor.

10. A rotary pump, said pump comprising:
    a motor;
    a ferromagnetic shaft operatively connected to said motor;
    a plurality of bipolar neo-magnet magnets operatively connected to and extending outward from said shaft in a spoke configuration, said bipolar magnets generating a strong magnetic flux;

a magnetically inert conduit for the passage of molten metal, said conduit having an inlet and an outlet and being substantially arcuate in shape;

wherein all of said bipolar magnets are oriented on the same side of said conduit such that said conduit is not captured between any of said plurality of bipolar magnets;

wherein said motor rotates said shaft and said magnets along one edge of said conduit thereby inducing eddy currents in molten metal in said conduit, said currents interacting with a moving magnetic field to produce force to pump said molten metal from said inlet to said outlet with said molten metal coming into contact with only said conduit;

wherein each of said bipolar magnets has a height and said conduit has an internal passage having a height; and wherein said height of each of said bipolar magnets is greater than or equal to approximately 2 to 3 times that of said conduit passage.

11. The rotary pump of claim 10 wherein said pump further comprises a cylindrical rotor which houses said bipolar magnets and said shaft.

12. The rotary pump of claim 10 wherein said pump further comprises a yoke, said yoke being directly adjacent to said conduit opposite the magnet poles and on an opposite side of said conduit from said magnet poles, and wherein said yoke is ferromagnetic and intensifies said magnetic flux.

13. The rotary pump of claim 12 wherein each of said bipolar magnets has a width $b_m$ and said yoke having a height $h_y$; and wherein said yoke height is approximately greater than or equal to ½ $b_m$.

14. The rotary pump of claim 10 wherein each of said plurality of bipolar magnets has a polar configuration opposite that of an adjacent bipolar magnet.

15. The rotary pump of claim 14 wherein said each of said bipolar magnets is separated from an adjacent bipolar magnet by a spacer, said spacers being manufactured from a magnetically inert material.

16. The rotary pump of claim 14 wherein said bipolar magnets are spaced apart angularly about said shaft and said conduit has the internal passage having a height h; and wherein said angular spacing of said bipolar magnets is approximately greater than or equal to 2 to 3 times twice the height of the conduit, (2h).

17. The rotary pump of claim 14 wherein each of said bipolar magnets has a width $b_m$ and said shaft has a radius R1, and wherein R1 is approximately greater than or equal to $b_m$.

18. The rotary pump of claim 10 wherein said motor, shaft and conduit are removably secured to a base, said base being capable of selective attachment to a container.

19. A method of pumping molten metal, said method comprising the steps of:

introducing molten metal into an inlet of a substantially arcuate-shaped conduit of a magnetic induction pump;

moving a plurality of bipolar permanent magnets about a single lateral exterior side of said conduit from said inlet to a conduit outlet whereby said plurality of bipolar permanent magnets do not capture said conduit therebetween, said plurality of bipolar permanent magnets generating a changing magnetic flux which induces eddy currents in said molten metal, said eddy currents interacting with the moving magnetic field creating a force sufficient to pump said metal through said conduit;

wherein said molten metal only contacts said conduit surface and no other component of said magnetic induction pump; and wherein said plurality of bipolar permanent magnets is eight bipolar neo-magnets operatively secured to and extending from a ferromagnetic shaft in a spoke configuration.

20. The method of claim 19 wherein said conduit is shrouded with a ferromagnetic yoke to intensify said magnetic flux.

21. The method of claim 19 wherein said plurality of bipolar permanent magnets are separated from one another by magnetically inert spacers; and wherein said plurality of bipolar permanent magnets, spacers and shaft are contained within a cylindrical rotor.

22. The method of claim 19 further comprising the step of securing said magnetic induction pump to a container of molten metal to be pumped.

* * * * *